Patented Jan. 8, 1935

1,987,168

UNITED STATES PATENT OFFICE 1,987,168

RUBBER FLOORING AND THE LIKE AND PROCESS OF MAKING THE SAME

Frans Cornelis Van Heurn, Amsterdam, Netherlands, assignor, by mesne assignments, to The Patent and Licensing Corporation, New York, N. Y., a corporation of Massachusetts No Drawing. Application June 1, 1931, Serial No. 541,550. In Germany June 18, 1930

12 Claims. (Cl. 94—15)

Various methods of affixing rubber floorings to their underlayers are already known. For this purpose rubber solutions, gums, solutions of casein, gutta percha, "Bakelite" and the like are used. The choice of these adhesives is particularly governed by the nature of the under-layers, which may consist of magnesium oxy-chloride compositions, Portland cement compositions, asphalt compositions, wood, etc.

In buildings the most common under-floors are those of cement and concrete. Although the rubber flooring can be affixed to such under-floors by means of the known agglutinants, the danger always remains of the connection getting detached upon the under-floor being or becoming damp.

These and similar inconveniences are avoided when working according to my invention. The latter concerns a process by which the rubber flooring can be secured to the under-floor at all times and irrespective of the nature of this underfloor, whilst there is no danger of the adhesion being destroyed by dampness of the under-floor.

According to my invention this is achieved by first applying to the under-floor a layer or film of a suitable metal, superposing thereon a layer of rubber latex and finally affixing the rubber decklayer after the latex layer has dried. It is also possible first to spread the latex layer upon the metal and to affix the metal upon the under-floor before, during or after the drying of the latex.

In a preferred embodiment rubber latex is used containing a metal compound, the metal of which is nobler than the metal affixed on the under-floor. It has been found that if the latex contains metal compounds in a finely divided condition or in solution, these may act upon a metal under-layer to such an extent that, after drying, a firm cohesion results between the mixture in which the metal compound is present and the underlying metal, provided the latter be less noble than the metal of the compound suspended in the mixture.

This phenomenon may be explained, so far as a chemical reaction between the metal and the metal compound is concerned, by the tendency some metals have to liberate other metals from their compounds, in connection with the place they hold in the series of tensions.

As a metal compound preferance is given to lead oxide whilst the metal substratum should preferably consist of zinc or aluminium, which can be affixed to the underfloor in various ways. Thus, for instance, metal sheets may in some way be anchored in the under-floor. The metal can also be applied in the form of a powder, as shavings or filings and is then applied to the unset underlayer, to which it will firmly adhere when the under-floor has set.

The rubber flooring material may consist of one or more layers of a mixture composed of rubber latex, stabilized or not, and fillers, vulcanizing agents, accelerators and the like. The latex may also be wholly or partly vulcanized. These layers may simply be spread over the layer containing the metal compound.

One may also affix pre-vulcanized rubber sheets or tiles to the latex layer, dried or not and containing the metal compound, by means of rubber solutions, latex preparations or other adhesives.

Example 1

Zinc sheets of about 1 dm square, provided with two standing-up edges bent at right angles, are pressed with the upstanding edges downward into the unset cement mortar, in which they become firmly embedded after the cement has set. Then a mixture is spread over consisting of stabilized latex mixed with 50% of lead oxide, calculated on rubber. After drying a rubber layer is formed which very firmly adheres to the zinc. Thereafter sheets or tiles of vulcanized rubber are applied by means of a rubber solution.

According to the invention good results are also obtained by spraying a film of the metal onto the underlayer according to Schoop's method.

Example 2

A concrete under-floor is covered by spraying with a film of aluminium. Thereupon a layer, about 2 mm. thick, of stabilized latex, containing about 40% of lead oxide, calculated on rubber, is spread over. After drying, a plurality of layers consisting of mixtures of stabilized latex, vulcanized or not, fillers, pigments etc. are applied thereon. For instance asbestine may be employed as a filler, whilst especially for the top layers a lightcoloured asphalt, so-called Albino-asphalt, may be used. This layer is subsequently vulcanized, e. g. by means of hot rollers if vulcanized latex is used.

Although the invention is described hereabove as being applied to rubber floorings, it is evident that it is not restricted thereto. It embraces in general products which are characterized by a metallic or metal-containing layer, connected with the remainder of the product by means of a part composed of rubber or the like or containing such material. It embraces also products, the metallic layer of which is decomposed, e. g. oxidized after some time.

I claim:

1. The process of uniting a rubber-containing layer to a metallic layer which comprises applying between the layers, a layer comprising an aqueous dispersion of rubber and a metallic compound, the metal of which is capable of being liberated by said metallic layer.

2. The process of uniting a rubber-containing layer to a layer comprising aluminium which comprises applying between the two layers, a third layer comprising an aqueous dispersion of rubber and lead oxide.

3. The process of uniting a rubber-containing layer to a layer comprising zinc which comprises applying between the two layers, a third layer comprising an aqueous dispersion of rubber and lead oxide.

4. The method of preparing rubber-surfaced flooring which comprises uniting a metallic layer to the foundation, coating the metallic layer with an aqueous rubber dispersion and adhesively uniting a rubber-containing layer to said metallic layer by means of said dispersion.

5. The method of preparing rubber-surfaced flooring which comprises uniting a metallic layer to the foundation, applying to said layer a coating comprising an aqueous rubber dispersion and a metallic compound, the metal of which is nobler than that of the metallic layer, and adhesively uniting a rubber containing layer to said metallic layer by means of said coating.

6. Method in accordance with claim 5, in which the metallic layer comprises aluminium and the metallic compound comprises lead oxide.

7. Method in accordance with claim 5, in which the metallic layer comprises zinc and the metallic compound comprises lead oxide.

8. A floor structure comprising a cement foundation, a layer of metal united thereto and a rubber-containing upper layer united to said metal layer.

9. A floor structure comprising a foundation, a layer of metal united thereto, a coating of dried latex on the upper surface of said metal layer and a rubber-containing layer adhesively united to said metal layer by means of said latex.

10. A floor structure comprising a foundation, a layer of metal united thereto, a rubber-containing layer above said metal layer, and a binder, comprising dried latex and the reaction products of the metal layer and a metallic compound, the metal of which is nobler than that of the metal layer, between said metal layer and said rubber-containing layer.

11. A floor structure comprising a foundation, a layer of aluminium united thereto, a rubber-containing layer above said metal layer, and a binder, comprising dried latex and the reaction products of the aluminium and lead oxide, between said metal layer and said rubber-containing layer.

12. A floor structure comprising a foundation, a layer of zinc united thereto, a rubber-containing layer above said metal layer, and a binder, comprising dried latex and the reaction products of the zinc and lead oxide, between said metal layer and said rubber-containing layer.

FRANS CORNELIS VAN HEURN.